I. TODARO.
CUTTER AND GRATER.
APPLICATION FILED DEC. 24, 1919.
1,364,220.
Patented Jan. 4, 1921.
2 SHEETS—SHEET 2.
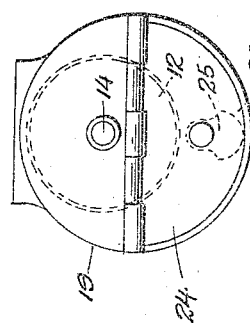
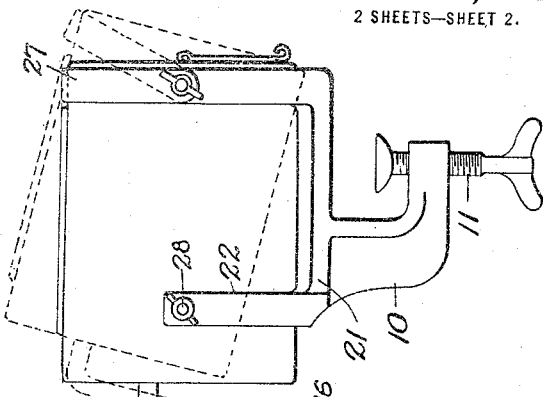
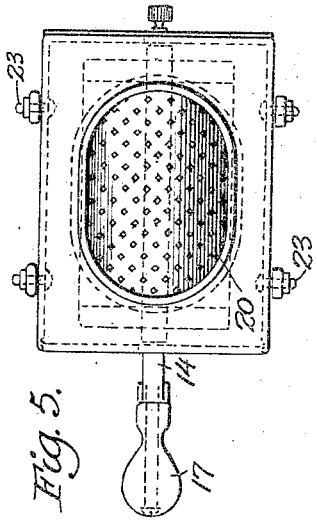
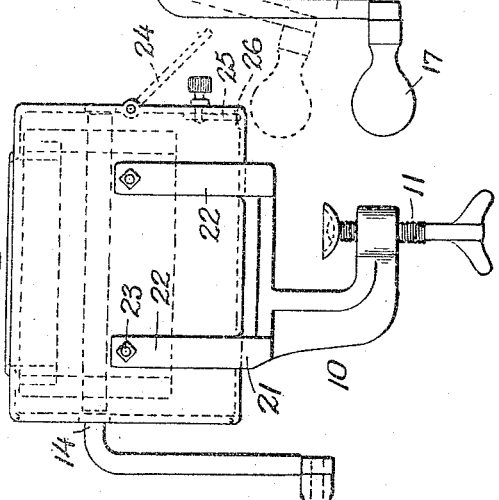
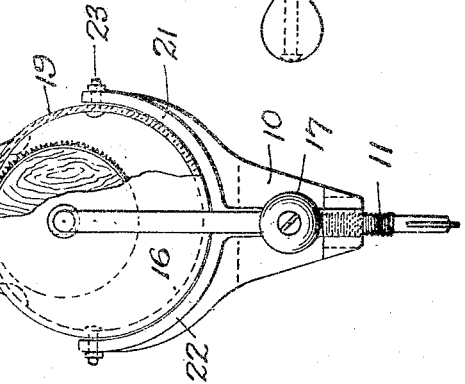
WITNESSES
INVENTOR
Ignatius Todaro
BY
ATTORNEYS

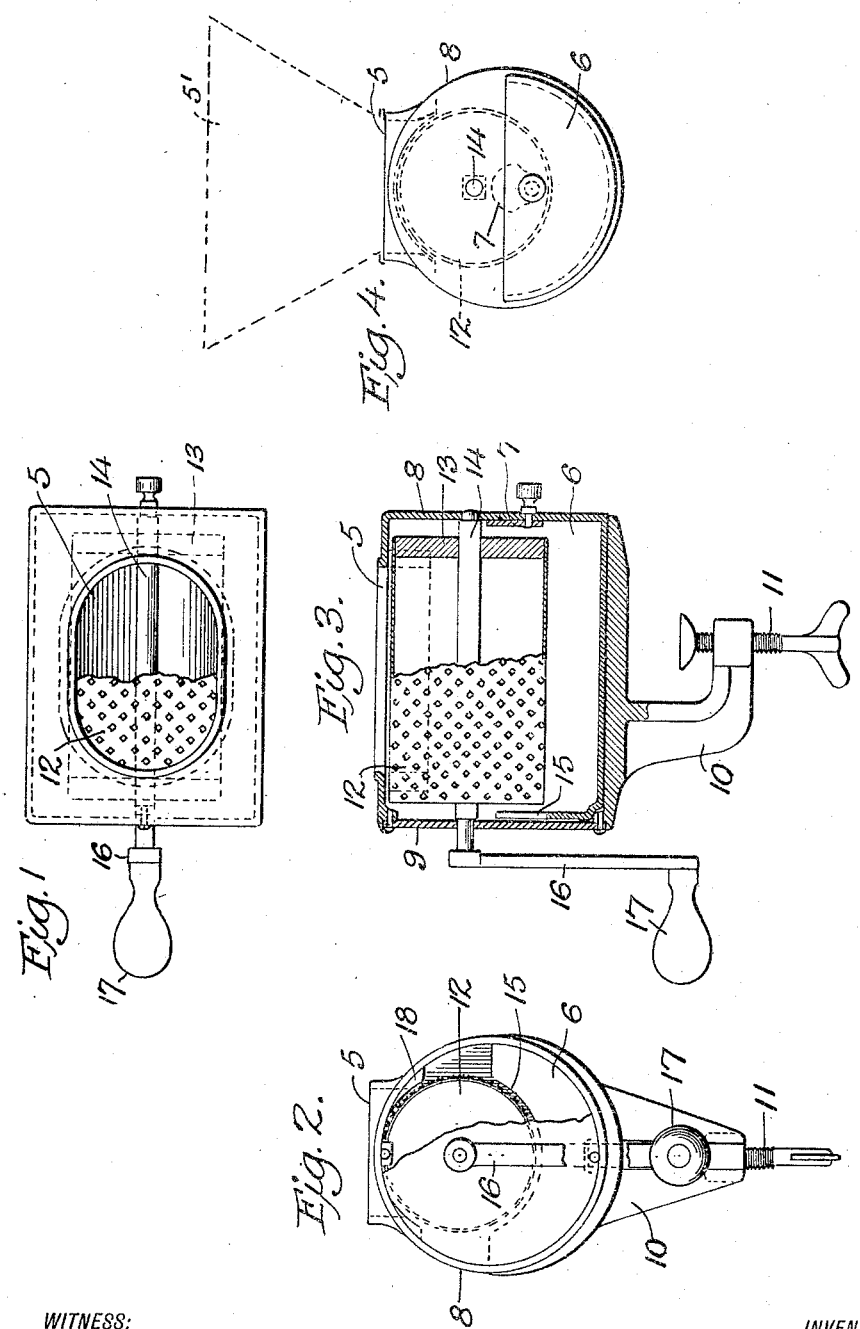

UNITED STATES PATENT OFFICE.

IGNATIUS TODARO, OF NEW YORK, N. Y.

CUTTER AND GRATER.

1,364,220. Specification of Letters Patent. Patented Jan. 4, 1921.

Application filed December 24, 1919. Serial No. 347,078.

*To all whom it may concern:*

Be it known that I, IGNATIUS TODARO, a citizen of the United States, residing at New York, New York county, New York State, have invented certain new and useful Improvements in Cutters and Graters, of which the following is a specification.

This invention relates to graters for cheese and bread and cutters for fruits and vegetables, or granulating and shredding various substances, particularly foods, and consists of a container with an opening in its upper side and a cylindrical grater or cutter below said opening and supported by a shaft with a handle. Beneath the cylinder is located a drawer and the container is provided with a clamp by means of which the whole may be secured to a base. The object of the invention being to provide a simple and cheap culinary article adapted to readily collect the material grated, or cut, as will be more fully described in the following specification, set forth in the appended claims, and illustrated in the accompanying drawings, wherein:

Figure 1 is a plan view of the improved device,

Fig. 2 is a rear end view,

Fig. 3 is a vertical sectional view,

Fig. 4 is a front end view,

Figs. 5, 6, 7 and 8, are similar views of a modified form of the device,

Fig. 9 is another modified form.

As shown in the drawing, the device is preferably cylindrical in construction with the opening 5 at the upper side and above which a chute $5^1$, may be placed to contain a supply of the food to be cut or grated. At one end is also located a semi-circular opening for the admission of the semi-cylindrical drawer 6, with turn button 7, to retain it within the container 8, and the other end is closed by a head 9, which is screwed or otherwise secured thereto while on the under side of the container is the jaw 10, and clamping screw 11, by which means it may be secured to a table or base.

The grating cylinder or cutter 12, may be of sheet metal with abrasive or cutting means on its outer surface and having heads 13, through which pass the shaft 14 and to which they are secured, being preferably of wood for lightness of construction, and the whole is eccentric with the cylinder 8, and dips into the drawer 6, while the latter is cut away at its rear edge 15, to allow its withdrawal.

The shaft 14, carries at one end the crank arm 16, and handle 17, to rotate the grater and the interior of the cylinder adjacent the opening 5, may be thickened at 18, to cause the same to conform with the cylinder.

As a modified form the container may be a glass jar, 19, with the opening 20, and head to carry the shaft, and adapted to be carried by the semi-cylindrical base 21, of metal with the above described attaching clamp and jaws 22, having perforations in their upper ends for the bolts 23, that also pass through holes in the glass container. A metal door 24, may be hinged over the opening through which the grated material is extracted and a button 25, engages a shoulder 26, to hold the door in its closed position. The grating cylinder 12 and its shaft 14, are arranged as above described.

In the modified form shown in Fig. 9, the container is also carried by the base 21, and has the jaws 22, but one of them carries a strap 27, and the other a set screw 28, so that it is not necessary to perforate the container and when it is desired to remove the contents of the container, it is elevated at the handle end after the screw 28, is loosened.

It is obvious that the grater may be otherwise modified or the parts differently arranged, without departing from the essential features above described or from the scope of the appended claims.

What I claim is:—

1. In a cutter and grater, the combination of a cylindrical container, an abrasive cylinder mounted eccentrically to rotate in the container, a hopper above the abrasive cylinder, and a drawer in the lower side of the container.

2. In a cutter and grater, the combination of a cylindrical container adapted to be secured at one side to a base and having an opening in its upper side, an eccentrically mounted abrasive cylinder within the opening and close to that side of the container and leaving a space for the grated material at the lower side of said container, heads in the ends of the container and one head having an opening, a shaft for the cylinder and journaled in the heads and having a crank arm, and a drawer in the lower side of the container and removable through the opening.

In testimony whereof, I have signed my name to this specification in the presence of two subscribing witnesses, this 18th day of December, 1919.

IGNATIUS TODARO.

Witnesses:
 JAMES F. DUHAMEL,
 ANGELO CASCIA.